US006270870B1

(12) United States Patent
Chess

(10) Patent No.: US 6,270,870 B1
(45) Date of Patent: Aug. 7, 2001

(54) MAILER WITH DUAL FACE LABEL MATERIAL

(75) Inventor: Stanley Chess, Jerome, ID (US)

(73) Assignee: Moore Business Forms, Inc., Grand Island, NY (US)

( * ) Notice: Subject to any disclaimer, the term of this patent is extended or adjusted under 35 U.S.C. 154(b) by 0 days.

(21) Appl. No.: 08/308,076

(22) Filed: Sep. 16, 1994

(51) Int. Cl.[7] .......... B32B 9/00

(52) U.S. Cl. .......... 428/40.1; 428/43; 428/211; 428/195; 283/81

(58) Field of Search .......... 428/40, 42, 43, 428/76, 174, 187, 195, 198, 202, 212, 261, 321.5, 480, 481, 500, 507, 537.5; 283/81, 94; 156/249; 503/226

(56) References Cited

U.S. PATENT DOCUMENTS

| | | | | |
|---|---|---|---|---|
| 3,312,005 | | 4/1967 | McElroy . | |
| 3,383,121 | * | 5/1968 | Singer | 282/28 |
| 3,854,229 | | 12/1974 | Morgan . | |
| 4,219,596 | * | 8/1980 | Takemoto et al. | 428/41 |
| 4,446,183 | | 5/1984 | Savagian . | |
| 4,460,634 | | 7/1984 | Hasegawa . | |
| 4,614,361 | | 9/1986 | Foster . | |
| 4,772,049 | * | 9/1988 | Engle | 282/9 R |
| 4,842,303 | | 6/1989 | Molenda . | |
| 4,863,195 | | 9/1989 | Capozzola . | |
| 4,932,684 | * | 6/1990 | Vermeulen | 283/81 |
| 4,951,970 | | 8/1990 | Burt . | |
| 4,968,547 | | 11/1990 | McCarthy . | |
| 4,986,868 | | 1/1991 | Schmidt . | |
| 4,991,878 | | 2/1991 | Cowan et al. . | |
| 5,031,939 | | 7/1991 | Webendorfer et al. . | |
| 5,173,081 | | 12/1992 | Greig . | |
| 5,230,938 | | 7/1993 | Hess et al. . | |
| 5,267,898 | | 12/1993 | Doll et al. . | |
| 5,299,834 | | 4/1994 | Kraige . | |
| 5,336,541 | | 8/1994 | Kobayashi . | |
| 5,378,301 | * | 1/1995 | Boreali et al. | 156/344 |

FOREIGN PATENT DOCUMENTS

| | | |
|---|---|---|
| 91 09 610 | 1/1992 | (DE) . |
| 0 512 153 A2 | 11/1992 | (EP) . |

* cited by examiner

*Primary Examiner*—Bruce H. Hess
*Assistant Examiner*—Michael E. Grendzynski
(74) *Attorney, Agent, or Firm*—Nixon & Vanderhye P.C.

(57) ABSTRACT

A business form uses a dual label construction to advantage, particularly in association with express delivery forms. A first sheet of paper has a first face with indicia and a second face with a first pressure sensitive adhesive system. A second sheet, substantially the same size and shape as the first sheet, has a first face, and a second face with a second pressure sensitive adhesive systems. The adhesive systems preferably are alternating strips of pressure sensitive adhesive release material, with small gaps between them, so that when the second faces are placed in face-to-face engagement with each other they will separate, providing adhesive on each of the second faces. The second sheet may be a substantially transparent plastic such as polyester, which may be placed over the first sheet, to protect it, after the first sheet has been adhered to a surface (e.g., a package for express delivery). The adhesive systems may be UV or corona treated to cure the release material strips and modify the tackiness of the adhesive. Alternatively, the second sheet first face also has indicia on it, and a number of perforations separating it into individual labels, e.g., each with bar coding. The first sheet first face may have a carbonless coating, and a third, and additional, sheets with cooperating carbonless coatings may be provided operatively connected over the first sheet.

20 Claims, 3 Drawing Sheets

*Fig. 1*
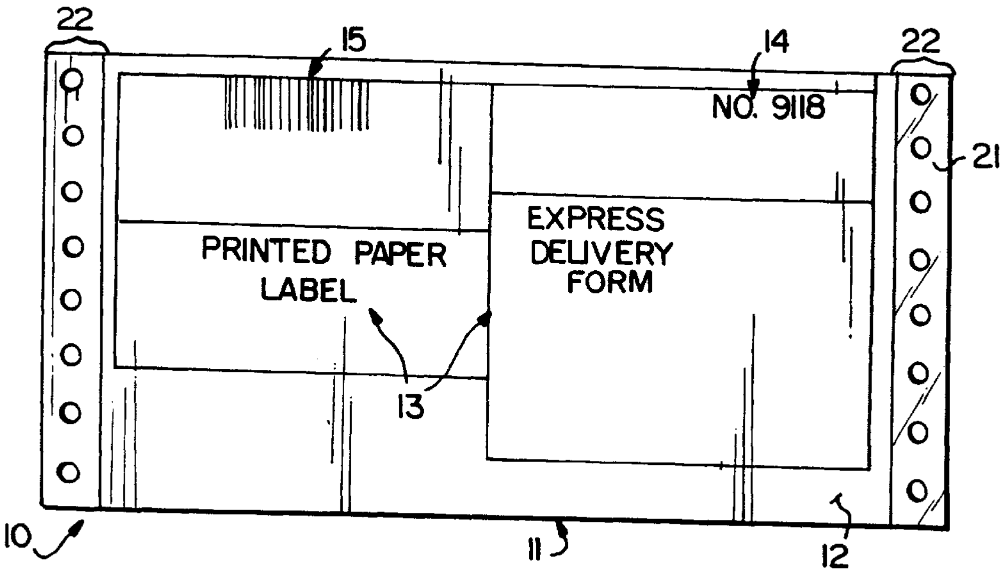
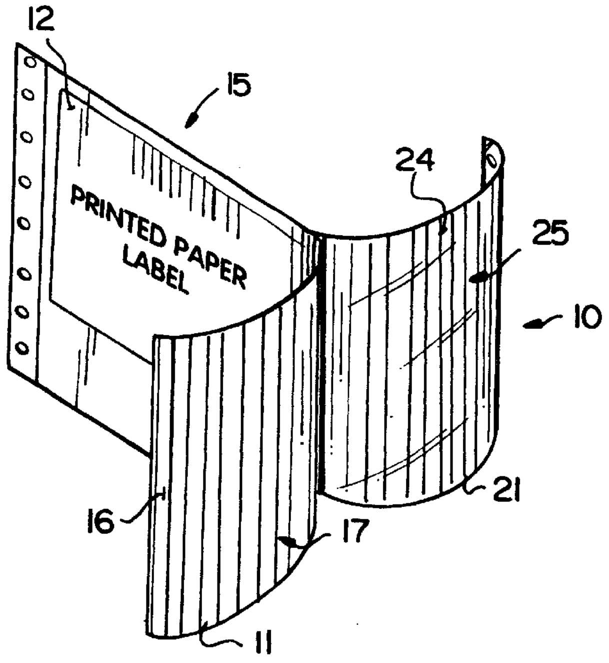
*Fig. 2*

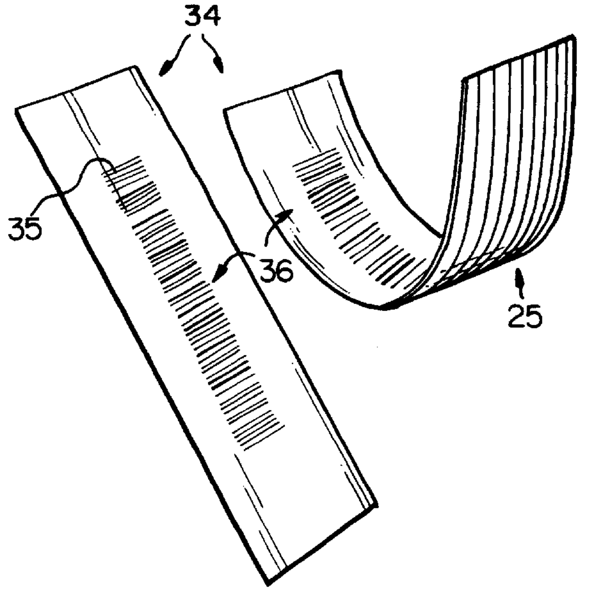
*Fig. 5*
*Fig. 6*
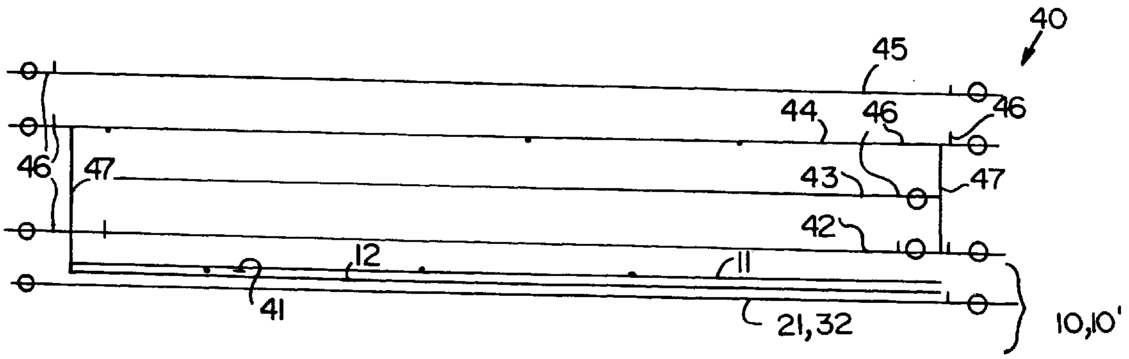

MAILER WITH DUAL FACE LABEL MATERIAL

BACKGROUND AND SUMMARY OF THE INVENTION

There are many types of business forms, including multiple ply business forms, where labels are desirable parts of the forms. Particularly for business forms associated with and utilized by express courier services labels are particularly helpful in being able to ensure tracking of packages, especially if a number of packages are sent at the same time. This normally requires that the form be larger than is otherwise desirable or necessary, and if the form has multiple plys, each ply may have to be larger than is necessary or desirable, with related waste. Also, many times the main business forms/label applied to the package being couriered needs protection from handling and the elements. In order to adequately provide this function, while still providing securement of the business form/label to a package, again at least parts of the business form are larger than is necessary.

According to the present invention, a business form is provided which has a minimal size yet maximum utility, particularly for avoiding the problems discussed above. The business form according to the present invention avoids the problems discussed above while still being eminently functional by providing at least one part of the form with a dual label construction, in which pressure sensitive adhesive is provided on both parts of the dual label so that after they are separated from each other they both may be applied to a surface (or one applied over the other). Dual labels are known per se as seen in U.S. Pat. No. 5,336,541(the disclosure of which is hereby incorporated by reference herein), and dual label stock is commercially available from Ko-Pack Corporation of Tokyo, Japan.

According to one aspect of the present invention, which is particularly suited for ensuring that an outgoing address form applied to a package, such as for an express courier service, is adequately protected from the environment, is provided comprising: A first, paper, sheet having a first face with indicia thereon, and a second face with a first pressure sensitive adhesive system. A second sheet substantially the same size and shape as the first sheet, and having a first face, and a second face with a second pressure sensitive adhesive system. The first and second adhesive systems are constructed so that the second faces of the first and second sheets when placed in face-to-face engagement with each other will separate from each other, providing adhesive on each of the second faces after they separate. The second faces are in aligned engagement with each other. And, wherein the second sheet is water-impermeable plastic, and the second sheet and the second adhesive system are substantially transparent, and the second adhesive system will adhere to the first face of the first sheet if applied thereto, to protect it.

The first and second adhesive systems are preferably alternate strips of pressure sensitive adhesive and release material, with small gaps therebetween, such as described in U.S. Pat. No. 5,336,541. However, other systems which will not positively adhere to each other, but will to other surfaces once separated, may also be utilized, such as (if properly developed and useable with paper sheets) different, incompatible, adhesives which are commonly used with double faced tape.

The first and second adhesive systems may be UV or corona treated to—when alternating strips of adhesive and release material are utilized—cure the release material strips, and modify the tackiness of the adhesive. The adhesive may be repositional adhesive, permanent adhesive, or almost any type of adhesive including aqueous, hot melt, or solvent-based additives. The release material itself may be silicone, Quilon® (from dupont Chemical Co.), or the like. If silicone (e.g., G.E. 9300) is utilized, it is typically subjected to UV curing after coating.

The second sheet is typically polyester, polyethylene, such as Mylar®, or the like, which is impervious to leaching by the release material or adhesive. The first sheet typically comprises 20–24 lb. paper stock (that is, a 500 sheet ream of 11"×17" paper weighs between 20–24 lbs.).

The indicia on the first sheet first face may comprise express courier indicia including outgoing and return address indicia and an identifying number in machine readable form (e.g., bar coding), human readable form, or both forms.

According to another aspect of the present invention, a business form is provided comprising: A first, paper, sheet having a first face with indicia thereon, and a second face with a first pressure sensitive adhesive system. A second, paper, sheet substantially the same size and shape as the first sheet, and having a first face and a second face with a second pressure sensitive adhesive system. The first and second adhesive systems being constructed so that the second faces of the first and second sheets when placed in face-to-face engagement with each other will separate from each other, providing adhesive on each of the second faces after they separate. The second faces in aligned engagement with each other. And, wherein the second sheet first face has indicia thereon, and further includes a plurality of lines of weakness separating the second sheet into a plurality of individual labels, each label with indicia thereon. In this case, both the first and second sheets are typically of 20–24 lb. paper stock.

The indicia on the first face may comprise express courier indicia with identifying number, as described above. The indicia on the second sheet, first face, preferably comprises machine readable indicia (e.g., bar coding) corresponding to the identifying number on the first face.

According to another aspect of the present invention, a multi-ply business form is provided comprising: A first, paper, sheet having a first face with indicia thereon, and a second face with a first pressure sensitive adhesive system, and wherein the first sheet first face has a carbonless coating thereon. A second sheet substantially the same size and shape as the first sheet, and having a first face, and a second face with a second pressure sensitive adhesive system. The first and second adhesive systems being constructed so that the second faces of the first and second sheets when placed in face-to-face engagement with each other will separate from each other, providing adhesive on each of the second faces after they separate. The second faces in aligned engagement with each other. And, a third sheet having a first face with indicia thereon, and a second face with a carbonless coating thereon cooperating with the first sheet carbonless coating and overlying and engaging the first sheet first face carbonless coating.

The second sheets may be either the plastic or paper sheet (with perforation lines) described above. At least one additional sheet, overlying the third sheet, may also be provided depending on how many parts to the form are desired. Each of the at least one additional sheets has cooperating carbonless coatings thereon (CF, CB, CFB, etc.) so that indicia impressed on the top most sheet of a multi-ply business form will transfer to the third sheet, and to the first sheet, first face.

It is a primary object of the present invention to provide a maximum utility minimum size business form, particularly one that is highly useful for express courier services, though not limited thereto. This and other objects of the invention will become clear from an inspection of the detailed description of the invention and from the appended claims.

BRIEF DESCRIPTION OF THE DRAWINGS

FIG. 1 is a top plan view of a first embodiment of the business form according to the invention;

FIG. 2 is a top perspective view of the form in FIG. 1 showing the first and second sheets thereof being separated from each other;

FIG. 5 is a top perspective view of several of the labels of the business form of FIG. 4 detached from the rest of the form and ready for use, and FIG. 6 is a schematic cross-sectional view of a third embodiment of the exemplary multi-ply business form according to the present invention.

DETAILED DESCRIPTION OF THE DRAWINGS

Figure 3:
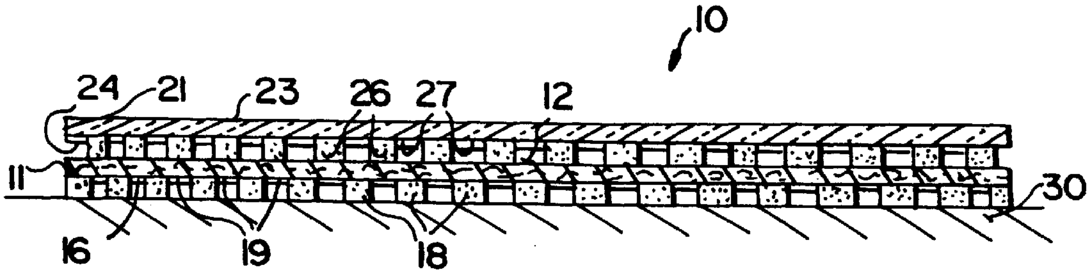
FIG. 3 is a side view showing the use of the form of FIGS. 1 and 2 with the transparent sheet of the form applied over and adhered to the paper sheet of the form, which is applied to a package and with portions greatly exaggerated in size for clarity of illustration.

An exemplary business form according to the present invention is shown generally by reference numeral 10 in FIGS. 1 through 3. The form 10 in FIG. 1 includes a first, paper, sheet 11 having a first face 12 with indicia 13, 14, 15 thereon (see FIG. 1). The indicia 13 preferably comprises printed indicia relating to the ultimate use of the form 10. One preferred use is as a form for use with packages by express courier service, the sheet 11 designed to be applied to the package. In this case, the indicia 13 will relate thereto, and will typically include outgoing address or return address indicia. Also, an identifying number will typically be provided, in human-readable form—as illustrated at 14 in FIG. 1—in machine-readable form—as illustrated at 15 in FIGS. 1 and 2—or both.

The first sheet 11, typically of 20–24 lb. paper, also has a second face 16 (see FIGS. 2 and 3). A first pressure sensitive adhesive system, illustrated schematically by reference numeral 17 in FIG. 2, is provided on the second face 16. The first pressure sensitive adhesive system 17, as seen more clearly but schematically in FIG. 3, may comprise—as taught per se in U.S. Pat. No. 5,336,541 (the disclosure of which is hereby incorporated by reference)—alternating strips of pressure sensitive adhesive 18 and release coating 19. The strips 18 may be repositional adhesive, permanent adhesive, or the like, whether aqueous, hot-melt, or solvent based, but normally are permanent adhesive. The release material 19 may be silicone (e.g., G.E. 9300, which is cured by exposure to UV radiation, Quilon® (from duPont Chemical Corp.), or the like.

The form 10 also comprises a second sheet 21 which is of a water-impermeable plastic, such as polyester or polyethylene (impervious to leaching of the release material 19 or adhesive 18), the sheet 21 having substantially the same size and shape as the first sheet 11. In FIGS. 1 and 2 the second sheet 21 is shown slightly wider than the first sheet 11, having marginal portions 22 thereof which include tractor drive openings.

The second sheet 21 also has a first face 23 (see FIG. 3) and a second face 24 (see FIGS. 2 and 3). On the second face 24 is a second pressure sensitive adhesive system, shown generally by reference numeral 25 in FIG. 2. The second adhesive system 25 is, in the preferred embodiment illustrated, the same as the first system 17 except that the exact arrangement of the adhesive strips 26 (see FIG. 6) and release material strips 27 are staggered so that when the sheets 11, 21 second faces 16, 24 are in aligned engagement with each other (FIG. 1, and shown being torn apart in FIG. 2) the strips 18 engage the release strips 27 and the adhesive strips 26 engage the release strips 19, with small gaps therebetween (as described in U.S. Pat. No. 5,336,541) so that they will separate from each other, so that adhesive 17, 25 is provided on each of the second faces 16, 24 after they separate (see FIGS. 2 and 3).

During manufacture of the pressure sensitive adhesive systems 17, 25, they may be subjected to "UV radiation or corona treated to cure the release material strips 19, 27 while simultaneously modifying the tackiness of the pressure sensitive adhesive strips 18, 26.

While the adhesive systems as described above are preferred, if available the systems 17, 25 may merely comprise incompatible different pressure sensitive adhesives, such as used on double faced tape, as long as suitable for use with the materials of the sheets 11, 21.

FIG. 3 shows use of the sheets 11, 21 after they have been separated (as illustrated in FIG. 2). The sheet 11 is placed so that the second face 16 thereof (with the adhesive strips 18) comes in contact with a substrate, such as a surface 30 of a package to be delivered utilizing the business form 10. After the sheet 11 has been properly adhered to the package 30, the second sheet 21—which has substantially the same size and shape—is overlaid on it, the second face 24 and adhesive strips associated therewith in engagement with the first face 12 of the first sheet 11. Since the sheet 21, and the adhesive system 25, are both substantially transparent, the indicia 13–15 are still readily readable when viewing from the top in FIG. 3.

Figure 4:
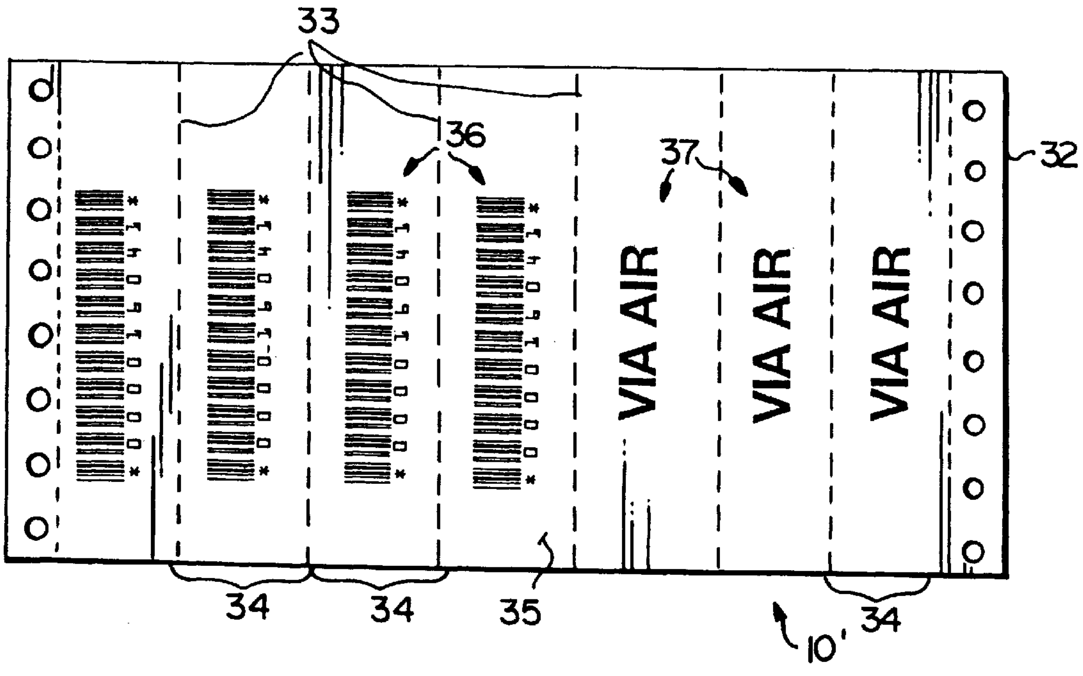
FIG. 4 is a bottom plan view of a second embodiment of the business form according to the invention.

FIGS. 4 and 5 illustrate another modification of the business form according to the present invention, shown generally by reference numeral 10' in FIG. 4. In this embodiment, the first sheet 11 and the adhesive systems 17, 25 are substantially identical to those described above with respect to FIGS. 1 through 3. However, in this embodiment for the second sheet a paper sheet 32 is provided which has a plurality of lines of weakness—typically perforations—33 formed therein and dividing sheet 32 into a plurality of individual labels 34, each having a size much less than that of the first sheet 11. On the first faces 35 of the labels 34 is indicia, such as the bar code indicia 36, or human readable indicia 37, or both. The bar code indicia 36 may correspond to the identifying number 14, 15 on the sheet 11. The opposite, second faces of the labels 34 have the second pressure sensitive adhesive system 25 associated therewith (see FIGS. 2 and 3). The second sheet 32 is also made of 20–24 lb. paper stock.

Utilizing the business form 10' of FIGS. 4 and 5, the first sheet 11 may be applied to a package 30—as illustrated in FIG. 3—and then the labels 34 are applied to other faces of the package 30, or to a number of satellite packages of the same shipment (as known per se from U.S. application Ser. No. 08/237,361, filed May 3, 1994).

FIG. 6 illustrates yet another embodiment of the business form 40 according to the present invention. In this embodiment the same basic business form 10, 10' of either the FIGS. 1 through 3 or FIGS. 4 and 5 embodiment are provided as the bottom ply, but additional plys are provided.

Also, the first face 12 of the first sheet 11 has a carbonless coating thereon, illustrated schematically by 41 in FIG. 6. Typically, the coating 41 would be a CF carbonless layer.

For the form 40 at least a third sheet 42, and typically other sheets—such as the sheets 43, 44, 45—are provided. The third sheet 42 has—as illustrated in FIG. 6—substantially the same size as the second sheet 21, 32, and also has a carbonless coating compatible with the coating 41. For example, if only the third sheet 42 is utilized as the additional ply, it may be a CB carbonless sheet, whereas if the additional ply 43 is provided, ply 42 will typically be a CFB sheet. The ply 43 may be a CFB or a CB sheet, while the ply 44 is typically a CB sheet. In any event, the carbonless coatings associated with the plys 42–44 are such that an image impressed on the topmost ply (e.g., 44) is ultimately readable on the first face 12 of the first sheet 11.

If desired, a fly sheet 45 may also be provided. The plys 42–45 may have the relative dimensions, perforation lines (e.g., perforations 46), and adhesive strips (e.g., adhesive strips 47) illustrated, or they may be modified depending upon the particular requirements for a particular form 40.

When the form 40 is utilized, the sheets 11, and 21, 32 are used as described above, while the other plys 42–44 will be used in other ways, such as a conventional record ply, customer-retaining ply, etc., as used commercially by express courier services.

Because of the dual label construction of the forms 10, 10' according to the invention, the forms 10, 10', 40 can have a minimun size yet have full functionality such as illustrated in FIG. 3, and utilize the labels 34. Thus, according to the present invention a highly-advantageous business form is provided.

While the invention has been herein shown and described in what is presently conceived to be the most practical and preferred embodiment thereof, it will be apparent to those of ordinary skill in is the art that many modifications may be made within the scope of the invention, which scope is to be accorded the broadest interpretation of the appended claims so as to encompass all equivalent structures and devices.

What is claimed is:

1. A business form comprising:

a first, paper, sheet having a first face with indicia thereon, and a second face with a first pressure sensitive adhesive system;

a second sheet substantially the same size and shape as said first sheet, and having a first face, and a second face with a second pressure sensitive adhesive system;

said first and second adhesive systems being constructed so that said second faces of said first and second sheets when placed in face-to-face engagement with each other will separate from each other, providing adhesive on each of said second faces after they separate;

said second faces in aligned engagement with each other; and wherein said second sheet is water-impermeable plastic, and said second sheet and said second adhesive system are substantially transparent, and said second adhesive system will adhere to said first face of said first sheet if applied thereto, to protect it.

2. A business form as recited in claim 1 wherein said first and second adhesive systems are alternating strips of pressure sensitive adhesive and release material, with gaps therebetween.

3. A business form as recited in claim 2 wherein said first and second adhesive systems have been UV or corona treated to cure said release material strips and modify the tackiness of said pressure sensitive adhesive.

4. A business form as recited in claim 2 wherein said first and second adhesive systems comprise permanent adhesive.

5. A business form as recited in claim 1 wherein said second sheet is polyester or polyethylene.

6. A business form as recited in claim 5 wherein said first sheet comprises 20–24 lb. paper stock.

7. A business form as recited in claim 1 wherein said indicia on said first sheet first face comprises express courier indicia including outgoing and return address indicia and an identifying number in machine readable form, human readable form, or both forms.

8. A business form comprising:

a first, unsegmented, paper, sheet having a first face with indicia thereon, and a second face with a first pressure sensitive adhesive system;

a second, paper, sheet substantially the same size and shape as said first sheet, and having a first face and a second face with a second pressure sensitive adhesive system;

said first and second adhesive systems being constructed so that said second faces of said first and second sheets when placed in face-to-face engagement with each other will separate from each other, providing adhesive on each of said second faces after they separate;

said second faces in aligned engagement with each other; and wherein said second sheet first face has indicia thereon, and further includes a plurality of lines of weakness separating said second sheet into a plurality of individual labels, each label with indicia thereon.

9. A business form as recited in claim 8 wherein said first and second adhesive systems are alternating strips of pressure sensitive adhesive and release material, with gaps therebetween.

10. A business form as recited in claim 9 wherein said first and second adhesive systems have been UV or corona treated to cure said release material strips and modify the tackiness of said pressure sensitive adhesive.

11. A business form as recited in claim 9 wherein said first and second adhesive systems comprise permanent adhesive.

12. A business form as recited in claim 8 wherein both said first and second sheets are of 20–24 lb. paper stock.

13. A business form as recited in claim 8 wherein said indicia on said first sheet first face comprises express courier indicia including outgoing and return address indicia and an identifying number in machine readable form, human readable form, or both forms; and wherein said indicia on said second sheet first face comprises machine readable indicia corresponding to said identifying number, on at least some of said labels.

14. A multi-ply business form comprising:

a first, paper, sheet having a first face with indicia thereon, and a second face with a first pressure sensitive adhesive system, and wherein said first sheet first face has a carbonless coating thereon;

a second sheet substantially the same size and shape as said first sheet, and having a first face, and a second face with a second pressure sensitive adhesive system;

said first and second adhesive systems being constructed so that said second faces of said first and second sheets when placed in face-to-face engagement with each other will separate from each other, providing adhesive on each of said second faces after they separate;

said second faces in aligned engagement with each other; and a third sheet having a first face with indicia thereon, and a second face with a carbonless coating thereon cooperating with said first sheet carbonless coating and overlying and engaging said first sheet first face carbonless coating.

15. A business form as recited in claim 14 wherein said second sheet is water-impermeable plastic, and said second sheet and said second adhesive system are substantially transparent, and said second adhesive system will adhere to said first face of said first sheet if applied thereto, to protect it.

16. A business form as recited in claim 15 wherein said first and second adhesive systems are alternating strips of pressure sensitive adhesive and release material, with gaps therebetween.

17. A business form as recited in claim 14 further comprising at least one additional sheet, overlying said third sheet, each of said at least one additional sheets having cooperating carbonless coatings thereon so that indicia impressed on the topmost sheet will transfer to said third sheet, and to said first sheet first face.

18. A business form as recited in claim 14 wherein said second sheet second face has indicia thereon, and further includes a plurality of lines of weakness separating said second sheet into a plurality of individual labels, each with indicia thereon.

19. A business form as recited in claim 18 wherein said first and second adhesive systems are alternating strips of pressure sensitive adhesive and release material, with gaps therebetween.

20. A business form as recited in claim 18 wherein said indicia on said first sheet first face comprises express courier indicia including outgoing and return address indicia and an identifying number in machine readable form, human readable form, or both forms; and wherein said second indicia comprises machine readable indicia corresponding to said identifying number, on each of a plurality of said labels.

* * * * *